417-111

EXAMINER

April 23, 1957 A. BOYNTON Re. 24,304

REMOTELY CONTROLLED FLOW VALVE

Original Filed Dec. 6, 1941 2 Sheets-Sheet 1

ALEXANDER BOYNTON,
INVENTOR,

BY John A. Robertson

ATTORNEY.

April 23, 1957 A. BOYNTON Re. 24,304

REMOTELY CONTROLLED FLOW VALVE

Original Filed Dec. 6, 1941 2 Sheets-Sheet 2

ALEXANDER BOYNTON,
INVENTOR,

BY John A. Robertson
ATTORNEY.

United States Patent Office

Re. 24,304
Reissued Apr. 23, 1957

24,304

REMOTELY CONTROLLED FLOW VALVE

Alexander Boynton, deceased, late of San Antonio, Tex., by Garrett Oil Tools, Inc., Longview, Tex., a corporation of Texas, assignee

Original No. 2,371,220, dated March 13, 1945, Serial No. 421,936, December 6, 1941. Application for reissue September 14, 1955, Serial No. 535,311

24 Claims. (Cl. 103—233)

Matter enclosed in heavy brackets [ ] appears in the original patent but forms no part of this reissue specification; matter printed in italics indicates the additions made by reissue.

My invention relates to remotely controlled flow valves for wells and deals with the general subject of my copending applications Serial Numbers 421,934 and 421,935 filed Dec. 6, 1941, *which matured into Patents Nos. 2,368,406 and 2,368,407, respectively.*

The principal object is to provide a flow valve that can be opened or closed selectively by means of a tool on a cable operated from the ground surface and which may be removed from the well in order to leave the flow tubing unobstructed.

Another object is to provide a series of valve controlled spaced openings in the tubing of a well, a selective one or more of said valves being open while the others are closed selectively.

Another object is to improve the ordinary automatic opening and the frequently uncertain closing of the now generally used automatic flow valves by substituting therefor a remotely controlled manually operated valve opening and closing means of positive action.

Another object is to provide a flow device especially adapted to deep wells because of its positive operation due to freedom from control by differential force, resulting in tubing withdrawals being seldom necessary.

Another object is to provide a remotely controlled flow valve which does not restrict the tubing passage.

A further object is to provide a series of flow valves having the advantages set out in the foregoing objects and which in addition thereto, can be employed without alteration for flowing a well through the casing, instead of through the tubing.

Other related objects are to provide remote controls for valves in cooling plants, ventilating systems, pipe lines, refineries, mines, production testing devices, well cementing equipment, and all other valves requiring remote control, including means for discharging liquids and gases at predetermined locations in warfare. The desirability of an operator remaining at a safe distance and opening valves to release poison gas is clearly indicated.

I attain the foregoing objects by means of an actuator slidable endwise and coincidentally rotatable over a nipple of the well tubing, the nipple having slots containing externally projecting pins slidable upon a series of helically inclined cam surfaces of the actuator to cause partial rotation thereof each time it is pulled upon and raised slightly by means of said pins supported upon it and which extend into the nipple. The pins are then returned by a spring, said return movement causing further rotation of said actuator; whereby a valve controlling the admission of pressure fluid into the tubing will be opened and closed alternately. The inner portions of said pins extending through slots and into the tubing are engageable by a special tool on a cable to operate said sleeve and valve, as will appear more fully from the following specification and the accompanying drawings, in which—

Similar characters of reference are employed to designate similar parts throughout the several views of each embodiment.

Figure 1:
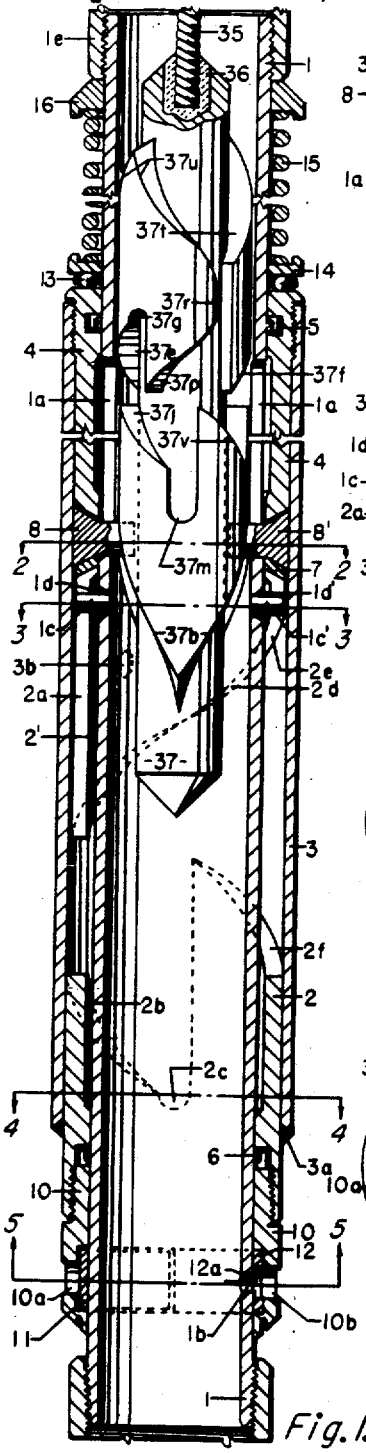
Fig. 1 is a longitudinal section through the preferred embodiment, the operating tool being shown in outside view within the device.
Figure 3:
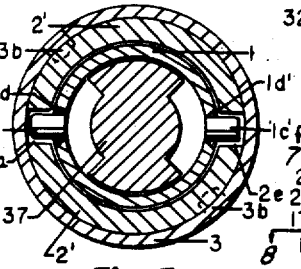
Fig. 3 is a cross section on the line 3—3, Fig. 1.
Figure 4:
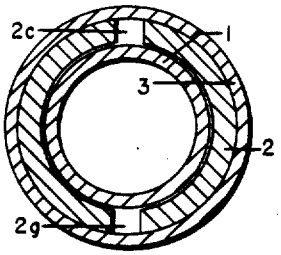
Fig. 4 is a cross section on the line 4—4, Fig. 1.
Figure 13:
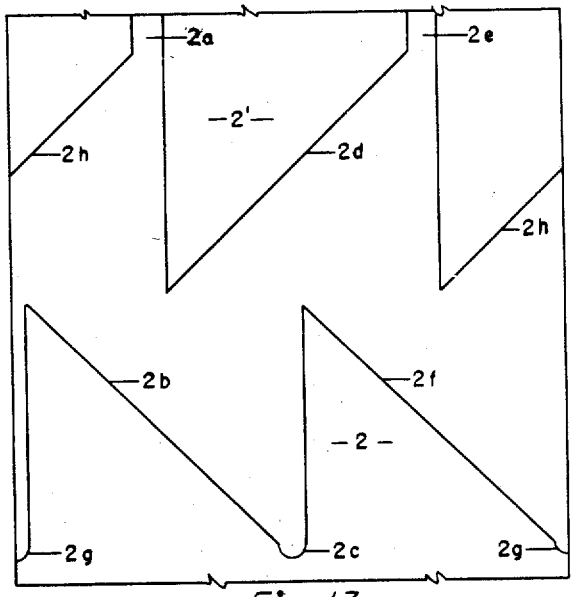
Fig. 13 is a diagram of the slots, pockets, and helically inclined cam surfaces of the actuator sleeve in Figs. 1 and 6.

In Fig. 1, the nipple 1, having the longitudinal slots 1a and the lateral inlet port 1b, is adapted to be connected into the eduction tubing of a well. The actuator sleeve 2, in two opposed portions 2 and 2', the latter portion being in two parts as appears in Fig. 13, is secured within the shell 3 by the circular weld 3a and by the spot welds 3b, Figs. 1 and 3. Manifestly the actuator sleeve and the shell 3 are in effect only one part but for manufacturing convenience only are shown to be unitized by welding. Likewise the locking sleeve 4 and the valve housing sleeve 10 are in effect parts of the actuator shown separate for manufacturing and assembling convenience only.

Figure 2:
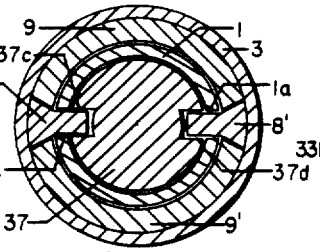
Fig. 2 is a cross section on the line 2—2, Fig. 1.

The guide pin 1c is secured in the nipple 1 by the weld 1d, and the guide pin 1c' is secured in the opposite side of that nipple by the weld 1d'. The ring 7 engaged upon the upper end of the sleeve upper portion 2', supports the actuator pins 8 and 8' upon which pins the locking sleeve 4 impinges by force of its threaded engagement within the shell 3. The semi-circular actuator pin spacers 9 and 9', Fig. 2, are likewise impinged between the sleeve 4 and the ring 7.

The actuator sleeve portions 2 and 2' and the locking sleeve 4, all secured upon the shell 3, are slidable over the nipple 1. The guide pins 1c and 1c' are slidable in the slots 2a and 2e of the actuator sleeve upper portion 2', Figs. 1, 3, and 13. The actuator pins 8 and 8' are slidable in the slots 1a of the nipple 1.

The coiled spring 15, engaged under the cap ring 16 supported by the coupling 1e, urges the washer 14 to engage the thrust bearing 13 upon the sleeve 4. The U cups or other form of packing 5 and 6 which are received within annular recesses of the sleeves 4 and 2, respectively, are slidable closely over the nipple 1 to prevent leakage into this nipple.

Figure 5:
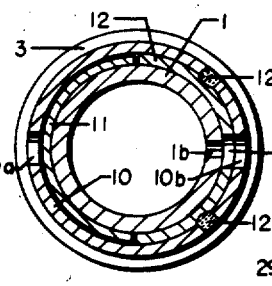
Fig. 5 is a cross section on the line 5—5, Fig. 1.

The valve housing sleeve 10, having the lateral openings 10a and 10b, is also slidable over the nipple 1 and is secured to the lower portion 2 of the actuator sleeve. This sleeve 10 has an internal annular recess within which the semi-circular sleeve valve 11 and its similarly formed spacer 12, having the transverse opening 12a, are received. The sleeve valve 11 is free within said recess and the spacer 12 is secured therein by the welds 12b, see Fig. 5.

The lower portion 2 of the actuator sleeve has the pin pockets 2c and 2g and the lower helically inclined cam surfaces 2b and 2f (see Fig. 13). The upper portion 2' of the actuator sleeve has the slots 2a and 2e and the upper helically inclined cam surfaces 2d and 2h, as also appears in Fig. 13. The upper inclined cam surface 2d is centrally above the pin pocket 2c; the upper inclined cam surface 2h is centrally above the pin pocket 2g; the lower inclined cam surface 2b is directly under the slot 2a; and the lower inclined cam surface 2f is directly under the slot 2e. This opposed relation between the inclined cam surfaces and the slots and pockets, coacting with the guide pins 1c and 1c', provides the valve position changing means, as will be explained further when the operation is discussed.

When the slot 2a contains the guide pin 1c and the slot 2e contains the guide pin 1c' the sleeve valve 11 is open and positioned opposite the opening 10a of the valve housing sleeve 10, while the lateral openings 10b, the transverse opening 12a, and the lateral inlet port 1b are in registration as in Fig. 1. When the slots 2a and 2e reverse their positions 180 degrees by a half rotation of the shell 3 and the valve 11, this valve will be closed over the inlet port 1b, as in Fig. 10.

Figure 6:
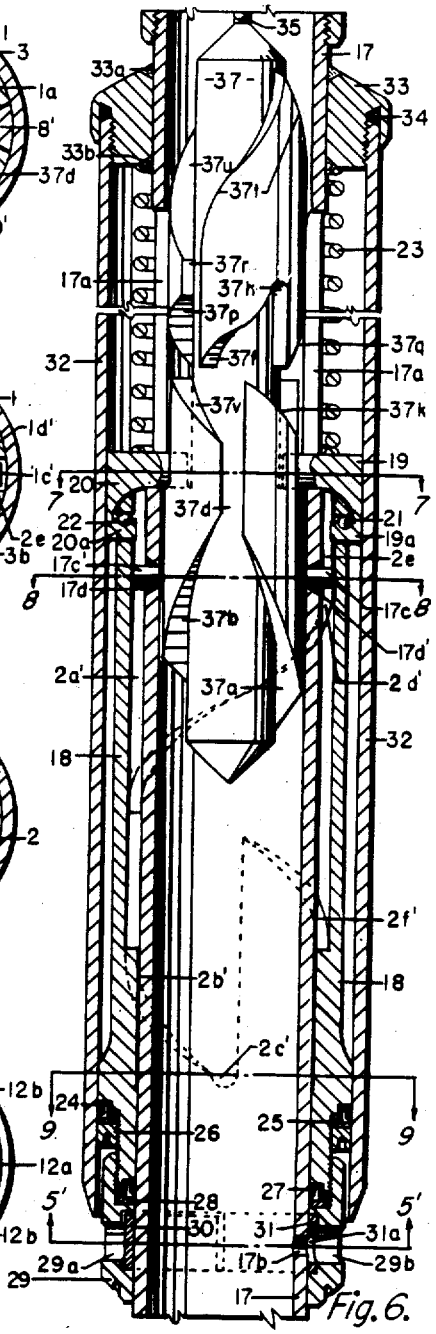
Fig. 6 is a longitudinal section through a modified construction, the operating tool being shown in outside view within the device.
Figure 7:
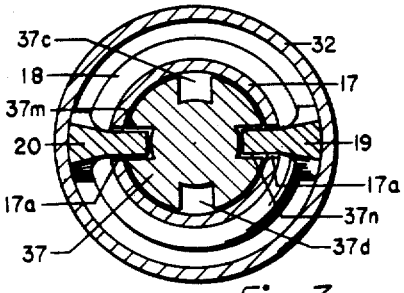
Fig. 7 is a cross section on the line 7—7, Fig. 6.
Figure 8:
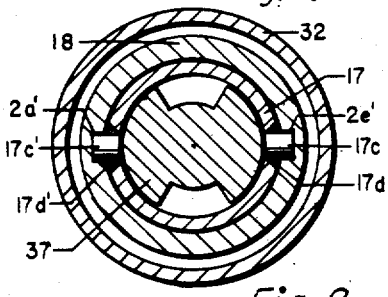
Fig. 8 is a cross section on the line 8—8, Fig. 6.
Figure 9:
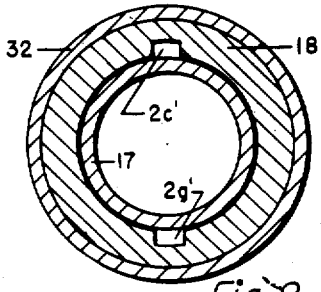
Fig. 9 is a cross section on the line 9—9, Fig. 6.

The modified construction illustrated in Fig. 6 further demonstrates employable constructions for carrying out the invention.

The nipple 17, having the longitudinal slots 17a and the lateral inlet port 17b, is adapted like the nipple 1 in Fig. 1, to be connected into the eduction tubing of a well. The actuator sleeve 18 is slidable within the shell 32 which is engaged with the cap 33 and upon the packing 34 within the cap which is secured upon the nipple 17 by the welds 33a and 33b. The U cup or other packing 27, closely engaged over the nipple 17, is secured in place by the support ring 28, locked between the actuator sleeve 18 and the valve housing shell 29 by force of the threaded engagement between these members. The U cup 24, closely engaged with the shell 32, is held within an annular recess of the sleeve 18 by the support ring 25 urged against the sleeve by the support ring 26 which is shown threadedly connected to the sleeve. The U cups 24 and 27 and the packing 34 are for the evident purpose of preventing pressure fluid outside of the device from leaking into the nipple 17 through the slots 17a.

The guide pins 17c and 17c' are secured into opposite sides of the nipple 17 by the welds 17d' and 17d, respectively. The slots 2a' and 2e' of the actuator sleeve 18 are slidable over these guide pins. The actuator pin 19 has its shoe 19a engaged within an annular recess of the sleeve 18 and the actuator pin 20 has its shoe 20a engaged within the same recess. These pins are spaced 180 degrees apart and have the balls 21 and 22, acting as thrust bearings engaged between their respective shoes and the upper surface of the slot which contains them. The actuator pins 19 and 20, having slight clearance within the shell 32, are slidable within the opposed longitudinal slots 17a of the nipple 17.

The coiled spring 23, free over the nipple 17, is engaged between the cap 33 and the actuator pins 19 and 20 for the purpose of normally engaging the actuator pins upon the lower end surfaces of the slots 17a, and thereby maintaining the inlet port 17b either open or closed.

Figure 10:
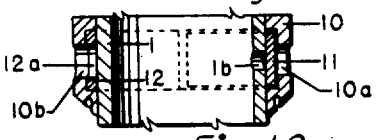
Fig. 10 is a vertical section through a portion of the device showing the valve closed.
Figure 11:
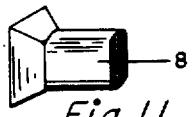
Fig. 11 is a perspective of the actuator pin in Fig. 1.
Figure 12:
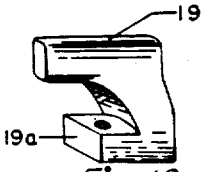
Fig. 12 is a perspective of the actuator pin in Fig. 6.

The valve housing shell 29 has the opposite lateral openings 29a and 29b. This shell is slidable closely over the nipple 17, and has an internal annular recess into which the semi-circular sleeve valve 30 is fitted loosely and into which the similarly formed sleeve valve spacer 31, having the transverse opening 31a, is secured by welds similar to those shown at 12b in Fig. 5. When the sleeve valve is open, the inlet port 17b and the openings 31a and 29b are in registration, as in Fig. 6. When that valve is closed, the shell 32 and the valve 30 have been rotated 180 degrees to close the inlet port 17b, in which position the pressure fluid exterior of the device will urge the valve 30 to closely engage the nipple 17, as appears in Fig. 10 illustrating the closed position of the similar valve in Fig. 1.

The slots 2a' and 2e', the pin pockets 2c' and 2g', the lower helically inclined cam surfaces 2b', 2f', the upper helically inclined cam surface 2d', and the unshown upper helically inclined cam surface corresponding to the helically inclined cam surface 2h in Fig. 13 will be understood as being formed like and in the same positional relation to each other as the corresponding slots, pockets, and helically inclined cam surfaces bearing the same reference characters unprimed in Fig. 13.

While I have shown pin pockets and slots in the actuators, it will be understood that neither are necessary to successful operation of the devices, the pin pockets being only a matter of nicety in finish and the slots being for assembling convenience only.

Installation, Figs. 1 and 6

By way of illustrating the best presently known mode of applying the invention, the devices illustrated in Figs. 1 and 6 may be installed in the eduction tubing of wells at intervals which, for example, may vary from 300 to 500 feet. Well conditions will control the number of devices which should be placed in any series, three to five devices in a series ordinarily being satisfactory.

Operation, Figs. 1 and 6

In both forms of this invention, the guide pins 1c and 1c' in Fig. 1 and 17c and 17c' in Fig. 6, contacted alternately by the upper and lower inclined cam surfaces of the actuator sleeve 2—2' in Fig. 1 and the corresponding sleeve 18 in Fig. 6, govern all rotational movements of the actuator sleeve and consequently they control the opening and closing movements of the pressure fluid control valve.

The path of pressure fluid entering the device illustrated in Fig. 1 is through the aligned openings 10b, 12a, and the inlet port 1b, as is apparent. The path of pressure fluid entering the modified construction is through the aligned openings 29b, 31a, and the inlet port 17b, as appears in Fig. 6.

The device in Fig. 1 has only two valve positions, one fully open as in Fig. 1 and the other completely closed as in Fig. 10.

Each time the actuator pins 8 and 8' are pulled upward and released to be returned by the spring 15, the shell 3 and the valve 11 will describe a one-half rotation about the nipple 1; thereby opening the valve if it be closed, or closing the valve if it be open.

For example, the valve 11 being open as in Fig. 1 with the guide pin 1c in the slot 2a and the guide pin 1c' in the slot 2e, to close the valve proceed as follows: Raise the actuator pins 8 and 8' until the lower inclined cam surface 2b contacts the guide pin 1c and the lower inclined cam surface 2f contacts the guide pin 1c'. These surfaces will rotate the actuator until the guide pin 1c will be contained in the pocket 2c and the guide pin 1c' will be contained in the pocket 2g. Then, release the pins 8 and 8'; whereupon the spring 15 will force the actuator downward until the upper inclined cam surface 2d will guide the pin 1c into the slot 2e and the upper inclined cam surface 2h will guide the pin 1c' into the slot 2a. The valve 11 will be closed then, as in Fig. 10.

The sleeve valve 11 being closed as in Fig. 10 with the guide pin 1c in the slot 2e and the guide pin 1c' in the slot 2a, to open the valve proceed as follows: Raise the actuator pins 8 and 8' until the lower inclined cam surface 2f contacts the guide pin 1c, and the lower inclined cam surface 2b contacts the guide pin 1c'. These cam surfaces will rotate the actuator sleeve until the guide pin 1c will contact the pin pocket 2g, and the guide pin 1c' will contact the pin pocket 2c. Then, release the pins 8 and 8'; whereupon the upper inclined cam surface 2h will guide the pin 1c into the slot 2a and the upper inclined cam surface 2d will guide the pin 1c' into the slot 2e. The sleeve valve 11 will be open again then, as in Fig. 1.

Manifestly, at the beginning of the foregoing operation, if the guide pin 1c should be in the slot 2e and the pin 1c' should be in the slot 2a, the operation will be so entirely similar to that described above as to be understood without further explanation.

The actuator pins 19 and 20 in Fig. 6 correspond to the actuator pins 8 and 8' in Fig. 1, and the guide pins 17c and 17c' in Fig. 6 correspond to the similar pins 1c and 1c' in Fig. 1, while the slots, pockets, and inclined cam surfaces of both constructions are so similar that the operation of the device illustrated in Fig. 6 will be understood from the preceding description relative to the operation of the device in Fig. 1.

Figure 14:
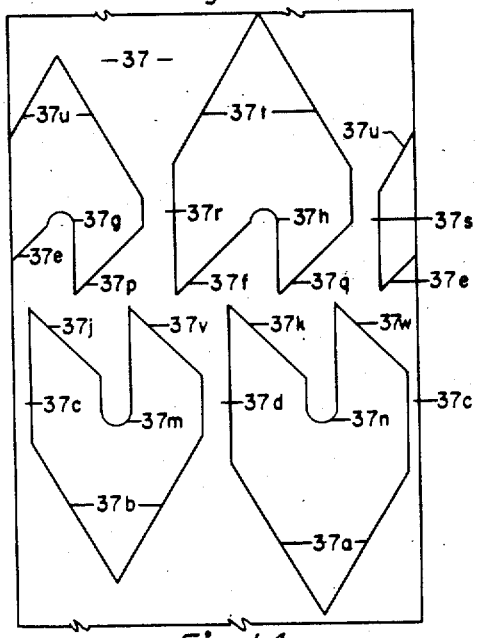
Fig. 14 is a diagram of the slots, pockets, and helically inclined cam surfaces of the operating tool in Figs. 1 and 6.

The operating tool, Figs. 1, 6, and 14

The same operating tool 37 is applicable to both constructions. The tool appearing in Figs. 1 and 6 has its slots, pockets, and helically inclined cam surfaces shown diagrammatically in Fig. 14. This tool is a highly important part of the invention because it is the best means known to the applicant whereby the valves of the devices illustrated in Figs. 1 and 6 can be opened and closed selectively.

The operating tool 37 has a series of slots, pockets, and helically inclined cam surfaces formed around a one piece rod or shaft-like member. This tool may be lowered into the tubing by means of the cable 35 upon which it is shown secured by the solder or babbitt 36 (see Fig. 1).

When the tool 37 encounters the actuator pins 8 and 8', Fig. 1, the long entrance guide slopes or cam surfaces 37a and the short entrance guide slopes or cam surfaces 37b will rotate the tool, if necessary, to receive the pins 8 and 8' within the entrance slots 37c and 37d to engage the actuator pins upon the first upper helically inclined cam surface 37f and the third upper helically inclined cam surface 37e which will rotate the tool further to engage these pins within the first upper pin pocket 37h and the second upper pin pocket 37g which will arrest the downward movement of the tool. Then, when the tool is raised, the first lower helically inclined cam surface 37k and the third lower helically inclined cam surface 37j will engage the pins and rotate the tool further to engage the actuator pins within the first lower pin pocket 37n and the second lower pin pocket 37m; thus permitting the actuator to be raised by pulling upon the cable. When next the tool is lowered, the pins 8 and 8' will be contacted by the second upper helically inclined cam surface 37q and the fourth upper helically inclined cam surface 37p; whereby the tool will be rotated further so that the exit slots 37r and 37s will pass over the actuator pins. The tool is ready then to be lowered to the next device of the series or to be withdrawn through the device or devices above it.

In raising the tool 37 through the upper devices, the long upper exit guide slopes or cam surfaces 37t and the short upper exit guide slopes or cam surfaces 37u will rotate the tool to receive the actuator pins 8 and 8' within the exit slots 37r or 37s. As the tool is raised further, the second lower helically inclined cam surface 37w and the fourth lower helically inclined cam surface 37v will rotate the tool slightly to enable the slots 37c and 37d to clear the pins.

While I have explained the operating tool 37 in connection with Fig. 1, it will be understood that the operation will be the same when applied to Fig. 6.

In these constructions employing two actuator pins, it will be observed that the long entrance guide slopes or cam surfaces 37a extend somewhat below the other short entrance guide slopes or cam surfaces 37b and that the long exit guide slopes 37t extend somewhat above their companion short slopes 37u. This one longer pair of guide slopes above and below the slots, pockets, and inclined cam surfaces provides that the tool, while traveling upward or downward, never can become impinged upon the same sides of the two actuator pins, the longer slopes serving as pilots to prevent such impingement. However, if the guide slopes are of equal length, the tool will function when so made.

While I have shown upper and lower pin pockets in the operating tool 37, it will be understood that these pockets are not essential and that they may be omitted without impairing the operation of the tool.

The operating tool, free to be rotated, thereby slightly twisting the proximate portion of the cable with it, is shunted axially by its inclined surfaces contacting the actuator pin 8, 8', whereby the tool, as it is reciprocated, alternately engages and releases these pins. After each pull upon these pins, the tool may be lowered through the device and then withdrawn from the well or it may be lowered to the next device for similar action.

It will be noted that one cable pull upon the tool 37 will change the device from open to closed, and vice versa. Manifestly, two cable pulls, spaced by a release of the tool, will enable the tool to be passed through any device; thereby leaving that device in the same position as before being pulled upon the first time. Thus the first pull changes the original condition of the device, whatever it might be, but the second pull restores the device to its original condition. Any change in the device is only temporary and of the briefest duration, if it is desired to lower the tool past a device and leave it in the condition in which it is found.

The outstanding operative characteristic of the tool 37 is as follows: It will land upon each device upon which it is lowered. Then one pull upon the tool will open the device, if closed, or close the device, if open. The tool may be lowered through the device which has last been pulled upon, after which it may be either raised out of the well or lowered to the next device to open if it closed or to close it if open, as was stated for the action of the tool upon the valve above.

For illustration, it will be assumed that there are several devices in a well, and that the upper device is open, all other devices being closed. Now, to close the upper device and open the third device for example, proceed as follows: Lower the operating tool 37 until it contacts the upper device and pull once. That will close the upper device. Then, lower the tool to the second device which is closed and which it is desired to leave closed. Pull upon this device twice. In doing so, land the tool upon the device and pull once. Then lower the tool through it and raise the tool above it. Then lower the tool upon the device again and pull once more. Then lower the tool through the device which will leave it closed. Lower the tool upon the third device which is closed and pull once. That will open it. The tool may be withdrawn through the upper devices without stopping and without changing any one of the valve positions.

It is apparent that the devices illustrated in Figs. 1 and 6 may be employed for either tubing or casing flow, the tubing into which the nipple 1 in Fig. 1 or the nipple 17 in Fig. 6 are connected being the eduction tubing for tubing flow and becoming the pressure fluid induction conduit for casing flow. However, if these devices be employed for casing flow, the U cups 5 and 6 in Fig. 1 and the similar cups 24 and 27 in Fig. 6 should be reversed to prevent possible leakage of pressure fluid through the devices.

It will be understood that all references to positions and directions such as "upper" and "lower," "upward" and "downward," "above" and "below" apply to the device as illustrated in the accompanying drawings wherein the upper portion of the device is shown uppermost and that such references are made for convenience of description only without any expressed or implied intentions to limit the invention.

It is obvious that many other mechanical changes, substitutions, and adaptations may be made in the construction and that equivalents may be substituted for the parts shown; and I reserve the right to make such mechanical changes, substitutions, and adaptations within the scope of the invention as herein disclosed.

I claim:

1. In a remotely controlled flow device: a nipple adapted to be connected into a string of tubing and having a pair of opposite longitudinal slots and an inlet port; a shell around said nipple; an actuator secured within said shell, said actuator being slidable over said nipple and having an internal peripheral opening forming two upper and two lower helically inclined cam surfaces in offset relation to each other, said upper cam surfaces sloping in one direction and said lower cam surfaces sloping in the reverse direction, there being a slot at the outer extremity of each upper cam surface and a pin pocket at the outer extremity of each said lower cam surface; a pair of opposite guide pins in said nipple, said pins extending into said internal opening and being engageable within said pockets, slidable in said slots and upon said inclined cam surfaces; a ring upon said actuator; a pair of opposed actuator pins upon said ring, said pins extending through said longitudinal slots; a locking sleeve slidable over said nipple and secured upon said shell in close spaced relation to said actuator pins; a spring urging said sleeve and actuator downward; hermetic means between said sleeve and nipple; hermetic means between the lower end of said actuator and nipple; a valve housing sleeve upon the lower end of said actuator and having opposed lateral openings, said last sleeve being slidable over said nipple; a sleeve valve spacer in said housing sleeve, said spacer having a transverse opening adapted to register with said lateral openings and said inlet port in one position of said actuator; a sleeve valve in said housing sleeve, said valve being adapted to close said inlet port in another position of said actunator; and means cooperative with said actuator pin for operating said sleeve valve.

2. In a remotely controlled flow device: a nipple adapted to be connected into a string of tubing and having opposite longitudinal slots and an inlet port; a cap secured upon said nipple above said slots; a shell secured upon said cap and surrounding said nipple; an actuator in said shell and slidable over said nipple and within said shell, said actuator having an annular opening and an internal circular opening, the latter opening forming two upper and two lower helically inclined cam surfaces in offset relation to each other, said upper cam surfaces sloping in one direction and said lower cam surfaces sloping in the reverse direction, there being a slot at the outer extremity of each upper inclined cam surface and a pin pocket at the outer extremity of each said lower inclined cam surface; hermetic means between said shell and actuator and between said actuator and nipple proximate the lower end of said actuator; two actuator pins slidably secured in said annular opening and extending through said longitudinal slots; two guide pins secured in said nipple and engageable within said annular opening to engage within said slots and pockets and upon said inclined cam surfaces when said actuator is reciprocated relative to said nipple; a valve housing sleeve upon the lower end of said actuator, said housing sleeve being slidable over said nipple and having opposite lateral openings; a sleeve valve spacer in said housing sleeve and formed with a transverse opening adapted to register with said lateral openings and said inlet port in one position of said actuator; a sleeve valve in said housing sleeve, said valve being adapted to close said inlet port in another position of said actuator; and means cooperative with said actuator pin for operating said sleeve valve.

[3. In a remotely controlled flow device: an operating tool; a nipple adapted to be connected into said tubing and having two opposite longitudinal slots and an inlet port; an actuator hermetically slidable over said nipple, said actuator having an internal peripheral opening forming two upper and two lower helically inclined cam surfaces in offset relation to each other, said upper cam surfaces sloping in one direction and said lower cam surfaces sloping in the reverse direction, there being a slot at the outer extremity of each upper inclined cam surface and a pin pocket at the outer extremity of each said lower sloping cam surface; two actuator pins loosely secured in said actuator and circularly movable relative thereto, said pins extending through said longitudinal slots and being engageable by said operating tool; a spring urging said pins to normally engage upon the lower surface of said slots; two opposite guide pins secured in said nipple and extending into said internal peripheral opening, said guide pins being engageable within said pockets, and slidable in said slots and upon said inclined cam surfaces; a valve housing sleeve upon the lower end of said actuator, said housing sleeve being slidable over said nipple and formed with opposite lateral openings; a sleeve valve spacer in said housing sleeve and having a transverse opening adapted to register with said lateral openings and said inlet port in one position of said actuator; and a sleeve valve in said housing sleeve, said valve being adapted to close said inlet port in another position of said actuator.]

[4. In a flow device: a remotely controlled operating tool; a nipple adapted to be connected into said tubing and having two opposite longitudinal slots and an inlet port; an actuator hermetically slidable over said nipple, said actuator having an internal peripheral opening forming two upper and two lower helically inclined cam surfaces in offset relation to each other, said upper cam surfaces sloping in one direction and said lower cam surfaces sloping in the reverse direction, there being a slot at the outer extremity of each upper cam surface and a pin pocket at the outer extremity of each said lower cam surface; two actuator pins loosely secured in said actuator and circularly movable relative thereto, said pins extending through said longitudinal slots and being engageable by said operating tool; a spring urging said pins to normally engage upon the lower surface of said slots; two opposite guide pins secured in said nipple and extending into said internal peripheral opening, said guide pins being engageable within said pockets, and slidable in said slots and upon said inclined cam surfaces; and valve means upon said actuator to open said port in one position of said actuator and to close said port in another position thereof.]

[5. In a flow device: a remotely controlled operating tool; a nipple adapted to be connected into said tubing and having an inlet port; an actuator hermetically slidable over said nipple, said actuator having an internal peripheral opening forming a pair of upper and a pair of lower helically inclined cam surfaces, said upper cam surfaces sloping in one direction and said lower cam surfaces sloping in the reverse direction, said pairs being circumferentially in offset relation to each other; two actuator pins loosely secured in said actuator and circularly movable relative thereto, said pins extending through said longitudinal slots and being engageable by said operating tool; a spring urging said pins to normally engage upon the lower surface of said slots; two opposite guide pins secured in said nipple and extending into said internal peripheral opening, said guide pins being engageable within said pockets, and slidable in said slots and upon said inclined cam surfaces; and valve means upon said actuator to open said port in one position of said actuator and to close said port in another position thereof, in combination with; an operating tool adapted to engage said actuator pins to pull upon same and rotate said actuator one-fourth of its circumference followed by reciprocation caused by said spring to complete one-half rotation of said actuator in order to alternately open and close said inlet port.]

6. In a flow device adapted to be remotely controlled from a string of tubing: a nipple adapted to be connected into said tubing and having an inlet port; an actuator hermetically slidable over said nipple, said actuator having an internal circular opening forming opposed and offset helically inclined cam surfaces; one or two actuator pins in said nipple, said pins being coefficient with said surfaces and adapted to produce partial rotation of said actuator each time the same is reciprocated a predetermined distance relative to said nipple; a valve on said actuator, said valve being adapted to close said inlet port in one position of said actuator and to open same when said actuator is rotated partially; and a spring urging said actuator to its lowermost position, in combination with; an operating tool adapted to engage said actuator pins to raise said actuator relative to said nipple and cause said guide pins to engage said inclined cam surfaces to produce partial rotation of said actuator as it reciprocates responsive to the force of said tool and spring to alternately open and close said inlet port.

7. In a remotely controlled flow device: a nipple adapted to be connected into a string of tubing and having an inlet port; a sleeve valve adapted to open and close said port when said valve is rotated relative to said nipple; an actuator adapted to rotate said valve, said actuator having opposed and offset inclined cam surfaces; guide pins in said nipple, said pins being coefficient with said inclined cam surfaces in said actuator; a spring urging said actuator in one direction; actuator pins in said actuator, said pins extending into said nipple and being slidable therethrough; and an operating tool adapted to engage said actuator pins to move said actuator in the opposite direction so that said guide pins will engage said cam surfaces to rotate said actuator and alternately open and close said port as said actuator is reciprocated by the opposed forces of said spring and tool.

8. In a remotely controlled flow device: a nipple having an inlet port; an actuator slidable over said nipple; a valve in said actuator; guide pins in said nipple, said pins being coefficient with said actuator to rotate the same and open or close said valve each time said actuator is reciprocated relative to said nipple; actuator pins in said actuator and slidable through said nipple; and a spring urging said actuator to position said valve relative to said port, in combination with; an operating tool coefficient with said spring to reciprocate said actuator to alternately open and close said valve.

9. In a remotely controlled flow device: a nipple adapted to be connected into a string of tubing and having lateral slots and an inlet port; a shell secured upon said nipple; an actuator slidable over said nipple and within said shell, said actuator having an internal peripheral opening forming an upper pair of inclined cam surfaces extending therearound and a pair of oppositely sloping cam surfaces opposed and in offset relation thereto; actuator pins in said slots and extending into said nipple, said pins being secured upon said actuator, and said actuator being rotatable relative thereto; guide pins secured in said nipple and coefficient with said inclined cam surfaces to partially rotate said actuator when the same is reciprocated; a spring urging said actuator pins and said actuator downward; a sleeve valve in said actuator, said valve being adapted to alternately open and close said port as said actuator is reciprocated; and an operating tool releasably engageable with said actuator pins to raise said actuator and cause said guide pins to engage one of said cam surfaces to produce partial rotation thereof, said rotation being continued by said pins engaging another of said cam surfaces when said tool is released, thereby alternately opening and closing said inlet port.

[10. In a remotely controlled flow device, the combination of: a nipple having longitudinal slots and an inlet port; a shell over and secured upon said nipple; an actuator slidable between said nipple and shell, said actuator having two pairs of opposed and offset inclined cam surfaces; guide pins in said nipple and coefficient with said cam surfaces to rotate said actuator as the same is reciprocated; actuator pins in said actuator, said last pins being slidable through said slots and engageable by an operating tool; a valve on said actuator and adapted to alternately open and close said port as said actuator is alternately reciprocated; an operating tool adapted to releasably engage said actuator pins and raise said actuator; and a spring to return said actuator when said tool releases said pins.]

11. A valve; a pair of guide pins carried by said valve; an actuator for said valve comprising a sleeve having: two upper and two lower helically inclined cam surfaces in offset relation to each other, said upper cam surfaces sloping in one direction and said lower cam surfaces sloping in the reverse direction, there being a slot at the outer extremity of each upper cam surface and a pin pocket for said guide pins at the outer extremity of each lower [ca msurface] *cam surface.*

[12. A valve; a pair of guide pins carried by said valve; an actuator for said valves comprising a sleeve having: a pair of upper helically inclined cam surfaces extending around said actuator and each sloping in one direction; and a lower pair of helically inclined cam surfaces confronting said upper pair and in offset relation thereto, said lower pair sloping in reverse direction from said upper pair; there being upper and lower pin-receiving elements for cooperation with said guide pins.]

13. In a remotely controlled flow device, an actuator assembly comprising: a shell; an actuator within said shell and secured thereupon, said actuator having an internal peripheral opening forming two upper and two lower helically inclined cam surfaces in offset relation to each other, said upper cam surfaces sloping in one direction and said lower cam surfaces sloping in the reverse direction, there being a slot at the outer extremity of each upper inclined cam surface and a pin pocket at the outer extremity of each said lower inclined cam surface; a ring upon said actuator; a pair of opposed actuator pins upon said ring; a locking sleeve secured upon said shell and in close spaced relation to said pins; means for housing packing proximate the extremities of said actuator; a valve housing sleeve upon the lower end of said actuator and having opposite lateral openings; a sleeve valve spacer in said housing sleeve and formed with a transverse opening; and a sleeve valve in said housing sleeve; and a tool for operating said valve.

14. In a remotely controlled flow device, an actuator assembly comprising: an actuator having an internal peripheral opening forming two upper and two lower helically inclined cam surfaces in offset relation to each other, said upper cam surfaces sloping in one direction and said lower cam surfaces sloping in the reverse direction, there being a slot at the outer extremity of each said upper cam surface and a pin pocket at the outer extremity of each said lower cam surface; a ring upon said actuator; a pair of opposed actuator pins upon said ring; a locking sleeve secured upon said shell and in close spaced relation to said pins; means for housing packings proximate the extremities of said actuator; a valve housing sleeve upon the lower end of said actuator and having opposite lateral openings; a sleeve valve spacer in said housing sleeve, said spacer having a tranverse opening; and a sleeve valve in said housing sleeve; and a tool for operating said valve.

15. A flow device adapted for remote control and comprising: a tubing having a flow passage for fluid and an inlet port; a ring-like valve member encircling said tubing and controlling communication through said port; means accessible from said flow passage to cause rotation of said ring-like valve member; and a tool cooperating with said means for operating said valve.

[16. A flow device adapted for remote control and comprising: a tubing having a flow passage for fluid, an inlet port, and a slot; a valve exteriorly of said tubing and controlling communication through said inlet port; a cylindrical actuator encircling said tubing and operatively connected to said valve; an operating member for said actuator extending through said slot into said flow passage; and a tool cooperating with said means for operating said valve.]

17. A flow device of the character described comprising: a tubing having a flow passage for fluid and an inlet port; a ring-like valve member encircling said tubing and adapted to be rotated to opened or closed positions, said valve member controlling communication through said port; a cylindrical actuator also encircling said tubing and operatively connected to said valve member to cause rotation of the latter; means accessible from said flow passage to move said actuator; and a tool cooperating with said operating member for operating said valve.

18. A flow device of the character described comprising: a tubing having a flow passage for fluid, an inlet port, and a slot; a ring-like valve member encircling said tubing and adapted to be rotated to opened or closed positions, said valve member controlling communication through said port; a cylindrical actuator also encircling said tubing and operatively connected to said valve member to cause rotation of the latter; cam means on said actuator for transforming rectilineal movement of said actuator into rotary movement of said valve member; an actuating pin on said actuator extending through said slot into said flow passage; and a tool cooperating with said actuating pin to operate said valve member.

19. A flow device adapted for remote control and comprising: a tubing having a flow passage for fluid and an inlet port; a ring-like valve member encircling said tubing and controlling communication through said port; cam means exteriorly of said tubing for rotating said valve member; means to actuate said cam means from said flow passage; and a tool cooperating with said last named means for operating said valve member.

*20. A flow device adapted for remote control and comprising: a tubing having a flow passage for fluid and an inlet port; a ring-like valve member encircling said tubing and rotatable about the longitudinal axis of the tubing from port opening to port closing positions and vice versa to control communication through said port; means accessible from said flow passage to cause rotation of said ring-like valve member; a wire line; and tool means carried by the wire line and movable thereby through the tubing into and out of engagement with said means to rotate said valve member from open to closed and from closed to open position; at least one of said accessible means and tool means having cooperating cam parts for translating longitudinal movement of said wire line into rotative movement of said valve member to move the latter between said open and closed positions.*

*21. A flow device adapted to be disposed in a well and to be remotely controlled from the earth's surface and comprising: a tubing having a flow passage for fluid and an inlet port extending through one wall of the tubing; a ring-like valve member encircling said tubing and having a port therein, said valve member being rotatable about the longitudinal axis of the tubing to move the port therein into and out of register with said inlet port to control flow through said inlet port; means accessible from said flow passage to cause rotation of said ring-like valve member; a tool cooperating with said means to rotate said valve member, at least one of said tool and means having parts operable to translate longitudinal movement of at least a portion of the tool into rotative movement to thereby rotate the valve member from open to closed and from closed to open positions; and means controllable from a point remote from the valve member for withdrawing said tool from the tubing.*

*22. A flow device adapted for remote control and comprising: a tubing having a flow passage for fluid and an inlet port in a lateral wall thereof; a ring-like valve member encircling said tubing and rotatable about the longitudinal axis of the tubing to open and close said inlet port and thereby control flow therethrough; means accessible from said flow passage to rotatively drive said ring-like valve member; tool means engageable with said accessible means to rotate said valve member; means manipulatable from a point remote from the valve member for moving the tool means into and out of the tubing; and one of said tool and accessible means having cam means for transforming rectilineal movement of said manipulatable means into rotary movement of the valve member.*

*23. A flow device adapted for remote control and comprising: a tubing having a flow passage for fluid and an inlet port; a ring-like valve member encircling said tubing and rotatable from port opening to port closing positions and vice versa to control flow through said port; means accessible from said flow passage to cause rotation of said ring-like valve member; a wire line; a tool movable through the tubing by said wire line and engageable with said means to rotate said valve member; and one of said tool and means having a pin engaging a cam surface curved about the longitudinal axis of said one of the tool and means so that longitudinal movement of the wire line is translated into rotary movement of the valve member.*

*24. In a flow device: a nipple adapted to be connected into a tubing and having an inlet port; an actuator hermetically slidable over said nipple, said actuator having an internal peripheral opening forming a pair of upper and a pair of lower helically inclined cam surfaces, said upper cam surfaces sloping in one direction and said lower cam surfaces sloping in the reverse direction, said pairs being circumferentially in offset relation to each other; two actuator pins loosely secured in said actuator and circularly movable relative thereto, said pins extending through said longitudinal slots and being engageable by an operating tool; a spring urging said pins to normally engage upon the lower surface of said slots; two opposite guide pins secured in said nipple and extending into said internal peripheral opening, said guide pins being engageable within said pockets, and slidable in said slots and upon said inclined cam surfaces; and valve means upon said actuator to open said port in one position of said actuator and to close said port in another position thereof, in combination with; a remotely controlled operating tool adapted to engage said actuator pins to pull upon same and rotate said actuator one-fourth of its circumference followed by reciprocation caused by said spring to complete one-half rotation of said actuator in order to alternately open and close said inlet port.*

*25. In a remotely controlled flow device, the combination of: a nipple having longitudinal slots and an inlet port; a shell over and secured upon said nipple; an actuator slidable between said nipple and shell, said actuator having two pairs of opposed and offset inclined cam surfaces; guide pins in said nipple and coefficient with said cam surfaces to rotate said actuator as the same is reciprocated; actuator pins in said actuator, said last pins being slidable through said slots; a valve on said actuator and adapted to alternately open and close said port as said actuator is alternately reciprocated; an operating tool adapted to releasably engage said actuator pins and raise said actuator; and a spring to return said actuator when said tool releases said pins.*

*26. A valve; a pair of guide pins carried by said valve; an actuator for said valve comprising a sleeve having: a pair of upper helically inclined cam surfaces extending around said actuator and each sloping in one direction; and a lower pair of helically inclined cam surfaces confronting said upper pair and in offset relation thereto, said lower pair sloping in reverse direction from*

*said upper pair; there being upper and lower pin-receiving elements for cooperation with said guide pins.*

*27. A flow device adapted to be disposed in a well for remote control thereof from the earth's surface comprising: a tubing adapted to be connected as a part of a conduit in a well and having a flow passage for fluid extending longitudinally therethrough and also an inlet port in a wall thereof; a ring-like valve member encircling said tubing and rotatable to open and close said inlet port to control flow therethrough; mean accessible from said flow passage to cause rotation of said ring-like valve member; tool means including a wire line extending to the earth's surface, said tool means being movable into and out of and manipulatable in the tubing by said wire line and being engageable with said accessible means to transmit force therethrough from said wire line to rotate the valve member; and one of said tool and accessible means having cam surfaces curved longitudinally along and about the longitudinal axis of said one of the tool and accessible means and a pin cooperable with said cam surfaces for translating rectilineal movement of said wire line into rotary movement of the valve member to selectively rotate said valve member from port opening to port closing position and vice versa.*

*28. In a remotely controlled flow device: operating tool; a nipple adapted to be connected into a tubing and having two opposite longitudinal slots and an inlet port; an actuator hermetically slidable over said nipple, said actuator having an internal peripheral opening forming two upper and two lower helically inclined cam surfaces in offset relation to each other, said upper cam surfaces sloping in one direction and said lower cam surfaces sloping in the reverse direction, there being a slot at the outer extremity of each upper inclined cam surface and a pin pocket at the outer extremity of each said lower sloping cam surface; two actuator pins loosely secured in said actuator and circularly movable relative thereto, said pins extending through said longitudinal slots and being engageable by said operating tool; a spring urging said pins to normally engage upon the lower surface of said slots; two opposite guide pins secured in said nipple and extending into said internal peripheral opening, said guide pins being engageable within said pockets, and slidable in said slots and upon said inclined cam surfaces; a valve housing sleeve upon the lower end of said actuator, said housing sleeve being slidable over said nipple and formed with opposite lateral openings; a sleeve valve spacer in*

*said housing sleeve and having a transverse opening adapted to register with said lateral openings and said inlet port in one position of said actuator; and a sleeve valve in said housing sleeve, said valve being adapted to close said inlet port in another position of said actuator.*

*29. In a flow device: a remotely controlled operating tool; a nipple adapted to be connected into a tubing and having two opposite longitudinal slots and an inlet port; an actuator hermetically slidable over said nipple, said actuator having an internal peripheral opening forming two upper and two lower helically inclined cam surfaces in offset relation to each other, said upper cam surfaces sloping in one direction and said lower cam surfaces sloping in the reverse direction, there being a slot at the outer extremity of each upper cam surface and a pin pocket at the outer extremity of each said lower cam surface; two actuator pins loosely secured in said actuator and circularly movable relative thereto, said pins extending through said longitudinal slots and being engageable by said operating tool; a spring urging said pins to normally engage upon the lower surface of said slots; two opposite guide pins secured in said nipple and extending into said internal peripheral opening, said guide pins being engageable within said pockets, and slidable in said slots and upon said inclined cam surfaces; and valve means upon said actuator to open said port in one position of said actuator and to close said port in another position thereof.*

*30. A flow device adapted for remote control and comprising: a tubing having a flow passage for fluid, an inlet port, and a slot; a valve exteriorly of said tubing and controlling communication through said inlet port; a cylindrical actuator encircling said tubing and operatively connected to said valve; an operating member for said actuator extending through said slot into said flow passage; and a tool cooperating with said operating member for operating said valve.*

References Cited in the file of this patent or the original patent

UNITED STATES PATENTS

| | | |
|---|---|---|
| 1,193,609 | Putnam | Aug. 8, 1916 |
| 1,683,930 | Staggs | Sept. 11, 1928 |
| 2,207,033 | Toney | July 9, 1940 |
| 2,245,009 | Nixon | June 10, 1941 |
| 2,251,421 | Rasmussen | Aug. 5, 1941 |